US008364716B2

(12) United States Patent  
Gaonkar et al.

(10) Patent No.: US 8,364,716 B2
(45) Date of Patent: Jan. 29, 2013

(54) METHODS AND APPARATUS FOR INCREMENTALLY COMPUTING SIMILARITY OF DATA SOURCES

(75) Inventors: Shravan Gaonkar, Sunnyvale, CA (US); Sagar Dixit, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 91 days.

(21) Appl. No.: 12/972,266

(22) Filed: Dec. 17, 2010

(65) Prior Publication Data

US 2012/0158709 A1 Jun. 21, 2012

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| 7,565,348 B1 | 7/2009 | Waldin et al. |
| 7,814,078 B1 | 10/2010 | Forman et al. |
| 2001/0047365 A1* | 11/2001 | Yonaitis ........................ 707/200 |
| 2008/0244355 A1 | 10/2008 | Bhandari |
| 2010/0063966 A1 | 3/2010 | Lemoine et al. |

OTHER PUBLICATIONS

International Search Report PCT/US2011/065893 dated May 22, 2012, pp. 1-3.
Written Opinion PCT/US2011/065893 dated May 22, 2012, pp. 1-5.

* cited by examiner

*Primary Examiner* — Isaac M Woo
(74) *Attorney, Agent, or Firm* — Perkins Coie LLP (57) ABSTRACT

Methods and systems for efficiently determining a similarity between two or more datasets. In one embodiment, the similarity is determined based on comparing a subset of sorted frequency-weighted blocks from one dataset to a subset of sorted frequency-weighed blocks from another dataset. Data blocks of a dataset are converted into hash values that are frequency-weighted. These frequency-weighted hash values can be compared to frequency-weighted hash values of another dataset to determine a similarity of the two datasets. In another embodiment, upon a change of a block in a subset of the dataset, the similarity value is re-determined without resorting or hashing the blocks of a dataset other than the blocks of the subset, resulting in an increased performance of a similarity comparison. In another embodiment, blocks of a dataset are excluded based on a block-filtering rule to increase the accuracy of the similarity comparison.

35 Claims, 8 Drawing Sheets

METHODS AND APPARATUS FOR INCREMENTALLY COMPUTING SIMILARITY OF DATA SOURCES

FIELD OF THE INVENTION

At least one embodiment of the present invention pertains to determining data similarity, and more particularly, to methods and apparatus for incremental determination of a similarity value based on a subset of frequency-weighted blocks of a dataset.

BACKGROUND

The exponential growth of digital information, credited to faster processors, lower cost of digital data storage, increasing availability of high data rate access, and development of new applications has increased the demand for computer storage. This increased dependence on computer data and data storage creates a need for more efficient data analysis technology.

With the increasing availability of low-cost, high-volume data storage devices, an increasing amount of data can be stored on an individual logical storage device, such as a physical disk drive, tape drive, or optical drive. Consumer hard drives, for example, have recently exceeded a terabyte of data storage capacity to meet the increasing demands for electronic storage. However, efficiently managing large amounts of data is burdensome and costly.

Technologies, such as de-duplication, have attempted to address some of the burden of managing large amounts of data by eliminating redundant data to improve storage utilization. In the de-duplication process, duplicate data on a logical storage device is deleted, leaving only one copy of the data, along with references to that one copy of the data. De-duplication is able to reduce the required storage capacity since only the unique data is stored. Each subsequent instance of duplicated data is simply referenced back to the one saved copy.

To maximize the benefits of de-duplication, it is advantageous to aggregate, to a single logical storage device, data files having maximum similarity to one another. However, it is time-consuming, and computationally intensive to compare each data block of one file, for example, to each data block of another file to determine the similarity between the two files. The computational complexity is further increased with larger files that may be associated with a Virtual Machine (VM).

A VM is normally represented as a set of files, including one or more configuration files and one or more disk image files. A configuration file stores configuration (settings) of the virtual machine. A virtual machine disk image file represents the operating system and data contained within the virtual machine and itself typically includes numerous individual files. A single VM disk image file can exceed several gigabytes of storage space, and a single logical storage device can contain numerous VMs, up to the capacity of the storage device.

Previous efforts to determine similarity between files relied on a "brute force" method. The brute force method utilizes set similarity based on determining both an intersection and union of all data blocks of each file undergoing comparison. For example, to determine similarity between VM 'A' and VM 'B', the following "brute force" equation has been utilized: $S(A,B) = |A \cap B|/|A \cup B|$, where 'A' is the set of data blocks (or corresponding hash values) of VM 'A', 'B' is the set of data blocks (or corresponding hash values) of VM 'B', '$\cap$' is the intersection operator, and '$\cup$' is the union operator. However, this technique is time consuming and processor intensive, especially for larger files because every block of the file is processed.

Other techniques utilize a Broder equation to attempt to offset the brute force method, by comparing only a subset of sorted data blocks of the files being compared. This technique avoids some of the issues of the brute force method by limiting the determination of the intersection of data blocks of the files to a predetermined number (k) of data blocks and eliminating the determination of the union of all data blocks of each file being compared.

One limitation with the Broder technique of computing file similarity is its inability to efficiently re-compute the similarity of two files previously compared. Re-computing files' similarity is appropriate after data blocks on one or both of the files change. A change can occur after an existing block is removed or modified, or a new block is created in the file. Previous techniques lacked the ability to incrementally adjust the previously computed data similarity without re-computing the Broder equation, which involves at least resorting all of the data blocks of the files and introduces the problems associated with the brute force method.

Another problem with the Broder technique is that it introduces variance in the accuracy of the similarity comparison. Under the Broder technique, accuracy of the similarity comparison is a function of the number (k) of sorted data blocks utilized in the similarity comparison. The lower the number (k), the less accurate the similarity comparison will be. The higher number (k) of sorted data blocks, the greater the accuracy of the similarity comparison will be. However, increasing the number (k) results in the original problem of the "brute force" method where the computational complexity and time commitment exceeded the usefulness of computing the similarity.

Therefore, the problems of computational complexity, high time-commitments, and poor accuracy when incrementally determining a similarity comparison of large files thus far has not been addressed and hinders current efforts to efficiently utilize data storage devices to manage and organize electronic information.

SUMMARY

Introduced herein are methods and apparatus for efficiently determining a degree of similarity between two or more datasets. In one embodiment, the similarity is determined based on comparing a subset of sorted frequency-weighted blocks from one dataset to a subset of sorted frequency-weighed blocks from another dataset. In one embodiment, data blocks of a dataset are used to compute unique, frequency-weighted hash values. The frequency-weight of a particular hash value is based on a summation other hash values of the dataset equaling the particular hash value. These frequency-weighted hash values can be compared to frequency-weighted hash values of another dataset to determine a degree of similarity of the two datasets. In another embodiment, upon a change of a block in a subset of the dataset, the similarity value is re-determined without resorting or hashing the blocks of a dataset other than the blocks of the subset, resulting in an increased performance of the similarity comparison. In yet another embodiment, blocks of a dataset are excluded based on a block-filtering rule to increase the accuracy of the similarity comparison.

The solution presented herein overcomes the time-consuming computation of performing a baseline similarity comparison when re-determining (updating) a similarity between two datasets by incrementally updating only a portion of the total number of blocks of a dataset. The technique introduced herein also overcomes the problem of poor accuracy of the similarity comparison result by filtering undesirable data blocks from the comparison using block-filtering rules and by using block-frequencies to increase the accuracy of the similarity comparison.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1A:
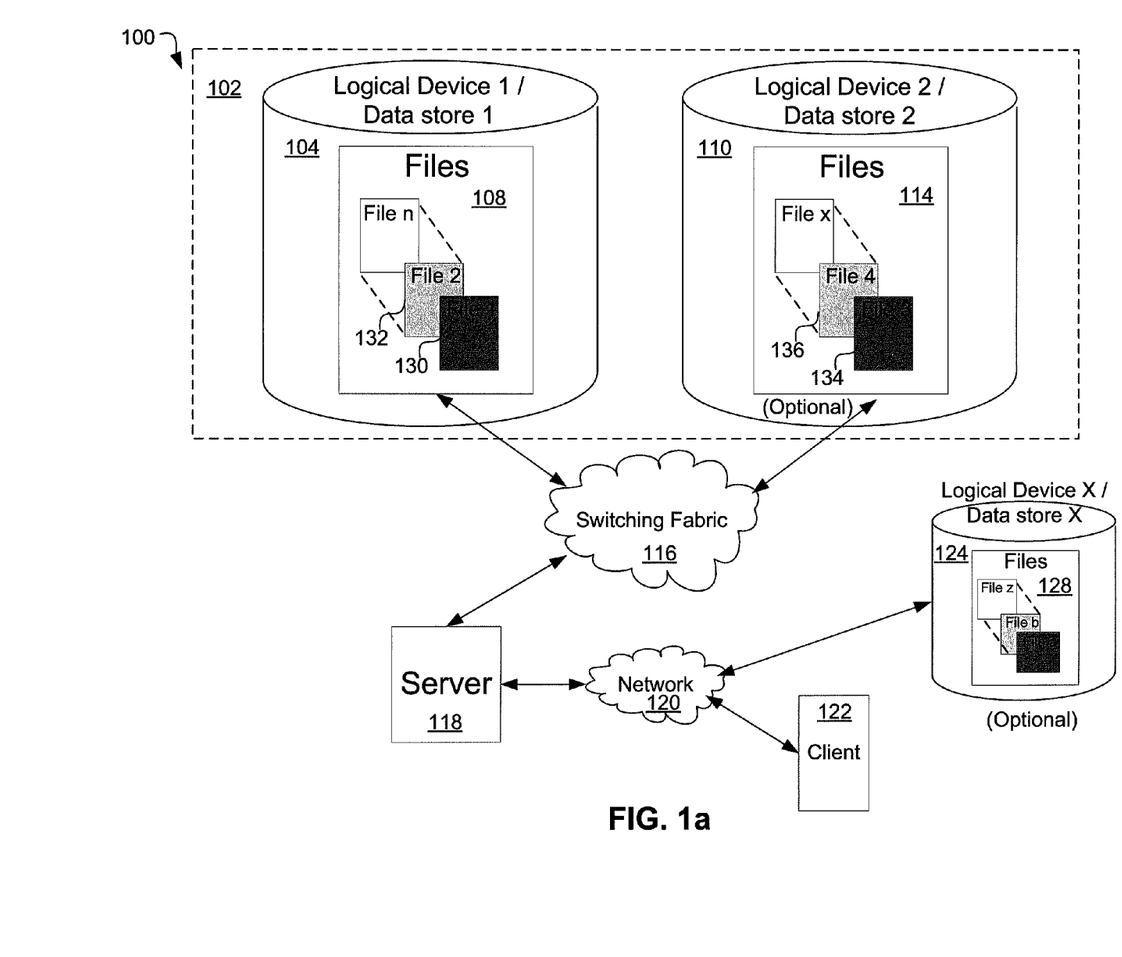
FIG. 1a illustrates a network storage environment in which the present invention can be implemented.

FIG. 1a shows a network configuration in which the techniques introduced here can be implemented. It is noted that the network environment described here is for illustration of one type of a configuration in which the techniques can be implemented, and that other network storage configurations and schemes can be used for implementing the techniques introduced herein.

FIG. 1a shows a network data storage environment 100, which includes a server system 118, and a data warehouse 102 containing a first data store 104 and an optional second data store 110. Each data store contains files 108/114 that are accessible, over a switching fabric 116, to the server 118. A file contains data that may be stored by at the block level at a data store 104/110. A block is a sequence of bytes or bits, having a nominal length (a block size). Data thus structured are said to be blocked. Blocked data are typically read a whole block at a time.

The switching fabric 116 connects together server 118 and data stores 104/110. The server 118 is connected, via a network 120, to a client 122. The first and/or second data stores 104/110 can optionally be located via network 120, as illustrated by data store 124.

The environment 100 can be utilized to perform aspects of the invention. For example in one embodiment, the environment 100 is used to identify a least similar file (or dataset) of the files 108 to free available space on the first data store 104, for example. In this regard, the least similar file (or dataset) is identified on the first data store, because removing that least similar file will provide the most free-space on the first data store due to data de-duplication or other storage techniques. In order to save storage space, the least similar file is migrated to a second data store 110 having files most similar to the least virtual file.

The server 118 may be, for example, a standard computing system such as a personal computer (PC) or server-class computer, equipped with an operating system. Alternatively, the server 118 can be one of the FAS family of storage server products available from NetApp®, Inc of Sunnyvale, Calif. The server 118 may perform various functions and management operations on the files 108, 114, and 128, such as computing a similarity comparison and performing data migrations of the files between data stores 104, 110, and 124.

The switching fabric 116 connects the server 118 to the data stores 114/110 of the data warehouse 102. The switching fabric can utilize any connection method known in the art, such as Fiber Channel, iSCSI, PCI Express, HyperTransport, or QuickPath. Alternatively, the switching fabric 116 can be a computer bus.

Data warehouse 102 is an aggregation of data stores. A data store, such as the first data store 104, stores files 108. In one embodiment, a data store can be a logical storage device that provides an area of usable storage capacity on one or more physical disk drives components. A logical storage device can contain one or more non-volatile mass storage devices or portions thereof. In another embodiment, a data store, such as the first data store 104, can be storage provided from a storage system, such as those available from NetApp, Inc of Sunnyvale, Calif. The data stores 104, 110, and 124 can make available, to the client 122 and server 118, some or all of the storage space of each respective storage system. For example, each of the non-volatile mass storage devices 104, 110, and 124 can be implemented as one or more disks (e.g., a RAID group) or any other suitable mass storage device(s). Alternatively, some or all of the storage space can be other types of storage, such as flash memory, SSDs, tape storage, etc. The server 118 and client 122 can communicate with the data stores 104, 110, and 124 according to well-known protocols, such as the SCSI protocol or the Fiber Channel Protocol (FCP) protocol, to make data stored in the data stores 104 and 110 available to the server 118 and/or client 122.

Files 108, 114, and 128 are electronic files that store data for use by the server 118 and/or client 112. Each file of the files 108 can include of any data capable of electronic storage including, for example, text, binary data, database entries, configurations, system information, graphics, disk images, and/or virtual disk images, etc. The number of files 108 is variably dependent on the storage capacity of the data store.

The server 118 can optionally connect, via the computer network 120, to the client 122 and data store 124 to allow for remote management of files. Network 120 can be, for example, a local area network (LAN), wide area network (WAN), or a global area network, such as the Internet, and can make use of any conventional or non-conventional network technologies.

The client 122 may be a standard computing device, such as a personal computer, laptop computer, smart phone or other computing system capable of connecting to the network 120. The client may perform various functions and management operations, such as the similarity comparisons and data migrations described within this application.

It is noted that, within the network data storage environment 100, any other suitable numbers of servers, clients, files, networks, and/or data stores may be employed.

Figure 1B:
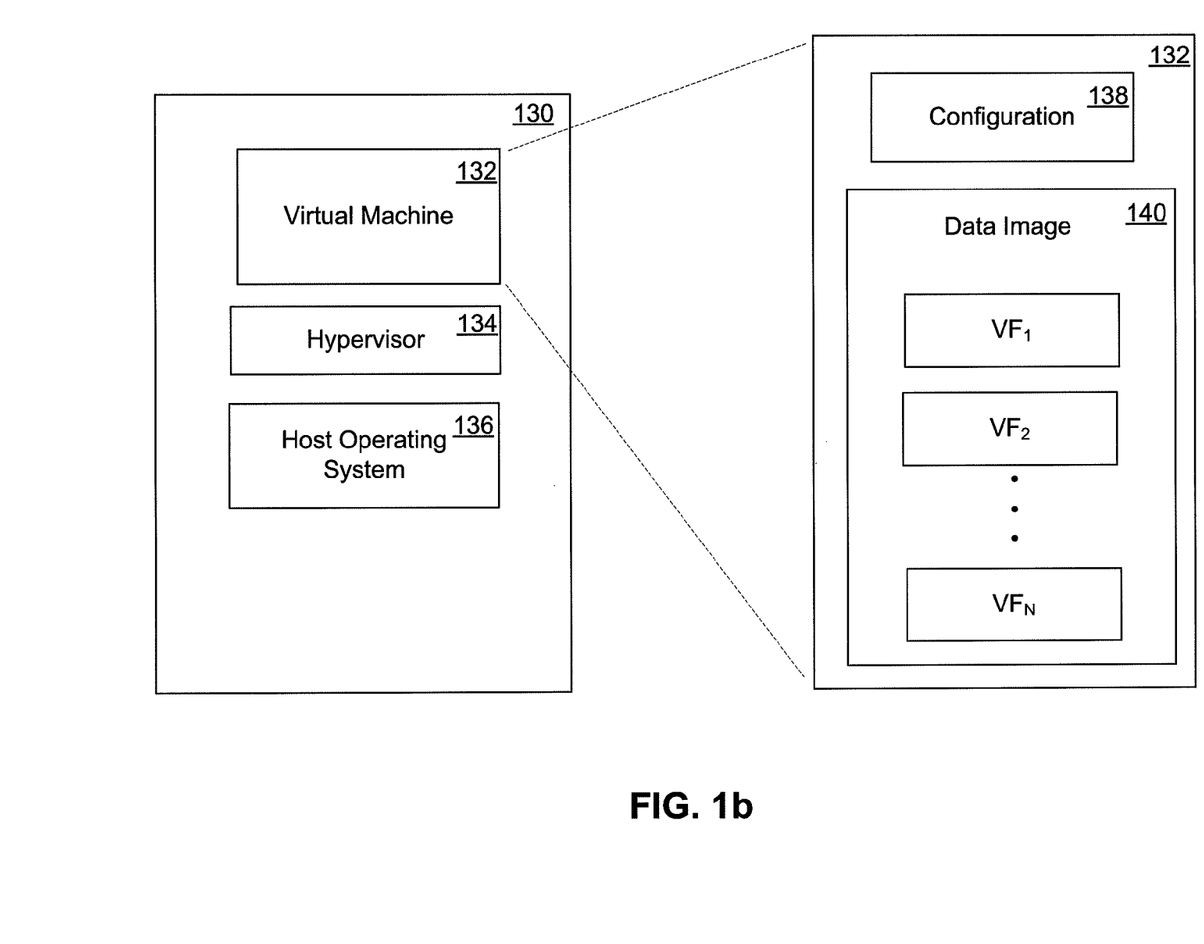
FIG. 1b illustrates a virtual machine represented as a configuration file and a data image file.

FIG. 1b illustrates a virtualization environment and provides context for the technique and system introduced here. The virtualization environment may be embodied in a physical host system 130, such as server 118, for example. However, it is noted that a separate server or multiple servers can implement the virtualization environment. A guest virtual machine 132 operates logically on top of a hypervisor 134 within a physical host system 130. Hypervisor 134 is a software layer that typically provides the virtualization, i.e., virtualization of physical processors, memory and peripheral devices. In certain embodiments, the hypervisor 134 may operate logically on top of a host operating system 136; in others, it may operate directly (logically) on top of the host hardware. The host operating system 136 can be a conventional operating system, such as Windows, UNIX or Linux. The physical host system 130 can be a conventional personal computer (PC), server-class computer, or potentially even a handheld device. The physical host system 130 includes various computer hardware, including a set of storage devices (not shown). Alternatively, one or more of the storage devices 104 and/or 110 may be external to the physical host system 130.

The virtualization environment can be, for example, a virtualization environment provided by VMWare® or Xen®, for example. The virtualization environment represents the virtual machine 132 in the form of two types of files, a configuration file 138 and at least one data image file 140. Although only one configuration file 138 and only one data image file 140 are shown, note that a virtual machine may be represented by two or more configuration files and/or two or more data image files. The configuration file 138 contains the configuration (settings) of the virtual machine 132. Each data image file 140 contains data blocks contained within the virtual machine 132 and itself includes numerous individual files, $VF_1, VF_2, \ldots, VF_N$. The data image file 140 is formatted according to the particular virtualization environment being used. Nonetheless, the technique and system introduced here enable a data image 140 to be compared at the data block level for a degree of similarity with another data image file (not shown). Additionally, one or more of the individual files $VF_1$ of the data image 140 may be compared at the data block level to compute a degree of similarity with another individual file $VF_N$.

The technique and system introduced above can be used with virtual machines of various designs and functions. For example, a virtual machine can be a virtual storage server such as used in a network storage environment, or an independent functional module or portion of a virtual storage server. Accordingly, a virtual machine data image from a virtual machine snapshot backup can be a data image of a virtual storage server.

Figure 2:
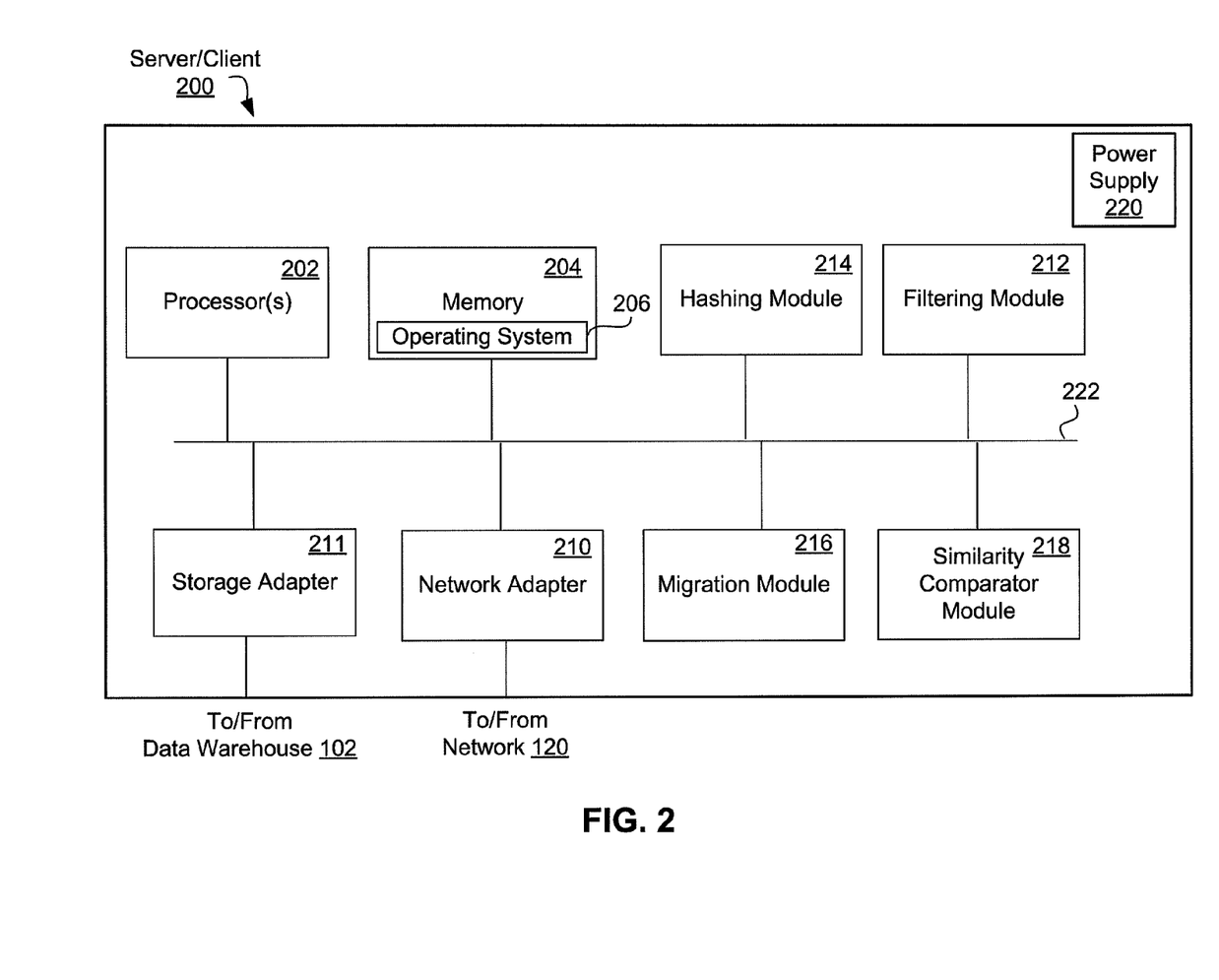
FIG. 2 is a high-level block diagram showing an example of the hardware architecture of a computer that can perform a similarity comparison.

FIG. 2 is a diagram illustrating an example of the internal architecture 200 of a server 118, 130 and/or client 122 that can implement one or more features of the invention. In the illustrated embodiment, the client/server architecture 200 is a computer system that includes a processor subsystem 202 that further includes one or more processors. The client/server architecture 200 further includes a memory 204, a network adapter 210, a storage adapter 211 (optional), a filtering module 212, a hashing module 214, a migration module 216, and a similarity comparator module 218, each interconnected by an interconnect 222 and powered by a power supply 220.

The client/server architecture 200 can be embodied as a single- or multi-processor storage system executing the server 118 or client 122 that preferably implements a high-level module, such as a storage manager, to logically organize the information as a hierarchical structure of named directories, files 108 and 114 (including virtual machines) on the data stores 104, 110, and 124.

The memory 204 illustratively comprises storage locations that are addressable by the processors 202 and components 210 through 222 for storing software program code and data structures associated with the present invention. The processor 202 and components may, in turn, comprise processing elements and/or logic circuitry configured to execute the software code and manipulate the data structures. The operating system 206, portions of which are typically resident in memory and executed by the processor(s) 202, functionally organizes the client/server architecture 200 by (among other things) configuring the processor(s) 202 to invoke storage and file related operations in support of the present invention. It will be apparent to those skilled in the art that other processing and memory implementations, including various computer readable storage media, may be used for storing and executing program instructions pertaining to the technique introduced here.

The network adapter 210 includes one or more ports to couple the client/server architecture 200 of the server 118 and/or client 122 over the network 120, such as a wide area network, virtual private network implemented over a public network (Internet) or a shared local area network. Additionally, the network adapter 210, or a separate additional adapter, is further configured to connect, via the network 100, to the data store 124. The network adapter 210 thus can include the mechanical, electrical and signaling circuitry needed to connect the client/server architecture 200 to the network 120. Illustratively, the network 120 can be embodied as an Ethernet network or a Fibre Channel (FC) adapter, for example. The server 118 and the client 122 can communicate, via the network 120 by, exchanging discrete frames or packets of data according to pre-defined protocols, such as TCP/IP.

The storage adapter 211 cooperates with the operating system 206 to access information requested by the server 118. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on non-volatile mass storage device within a data store 104 and 110.

The operating system 212 facilitates the server's and the client's access to data stored within the data stores 104 and 110. In certain embodiments, the operating system 206 implements a write-anywhere file system that cooperates with one or more virtualization modules to "virtualize" the storage space provided by the data stores 104 and 110. In the illustrative embodiment, the operating system 206 is a version of the Data ONTAP® operating system available from NetApp, Inc. implementing the Write Anywhere File Layout (WAFL®) file system. However, other storage operating systems are capable of being enhanced or created for use in accordance with the principles described herein.

The filtering module 212 contains logic to filter data blocks from the comparison by the similarity comparator module

218. The filtering module 212 can selectively filter certain types of data blocks through the use of block-filtering rules. A block-filtering rule contains programmable logic, alterable by an end-user, to selectively allow or disallow certain data blocks for comparison, based on the data represented by the data block. For example, data blocks representing free space on a virtual machine image file can be filtered based on a free-space filtering rule to provide increased efficiency in computing a similarity comparison between files. Similarly, data blocks representing portions of an operating system page-file can be automatically filtered (omitted) from a similarity analysis to increase the accuracy of a similarity comparison of virtual machine image files. Alternatively, a block-filtering rule can selectively allow a certain type of data block for similarity comparison.

The hashing module 214 generates a hash value for each of the data blocks for comparing during the similarity comparison, described below. The hashing module 214 determines a hash value of a data block, based on a hashing algorithm. Creating a hash value for a data block simplifies the subsequent similarity comparison by converting large, possibly variable-sized amount of data into a small datum, usually a single integer that may serve as an index to an array. The values returned by a hash function are called hash values, hash codes, hash sums, checksums or simply hashes. Hash functions are mostly used to speed up table lookup or data comparison tasks—such as detecting duplicated or similar records in a large file. Various mathematical functions can be utilized by the hashing module 214, such as MD2, MD4, MD5, CRC, SHA, SHA256, or other mathematical algorithms capable of implementing a hashing function. Alternatively, the present invention may operate without the use of hashing algorithms by, for example, simply comparing the layout of bits of one data block to the layout of bits of another data block.

The migration module 216 is configured to initiate data migrations between the data stores 104, 110 and 124. In one embodiment, the migration module 216 is configured to initiate a data migration of a file 108 from data store 104 to data store 110 or 124.

The similarity comparator module 218 is configured to generate a similarity value that expresses the degree of similarity between files. In one embodiment, the similarity comparator module 218 can be a processor 202, programmed by the operating system 206 or other software stored in memory 204. Alternatively, the similarity comparator module 218 can be special-purpose hardwired circuitry.

Figure 3:
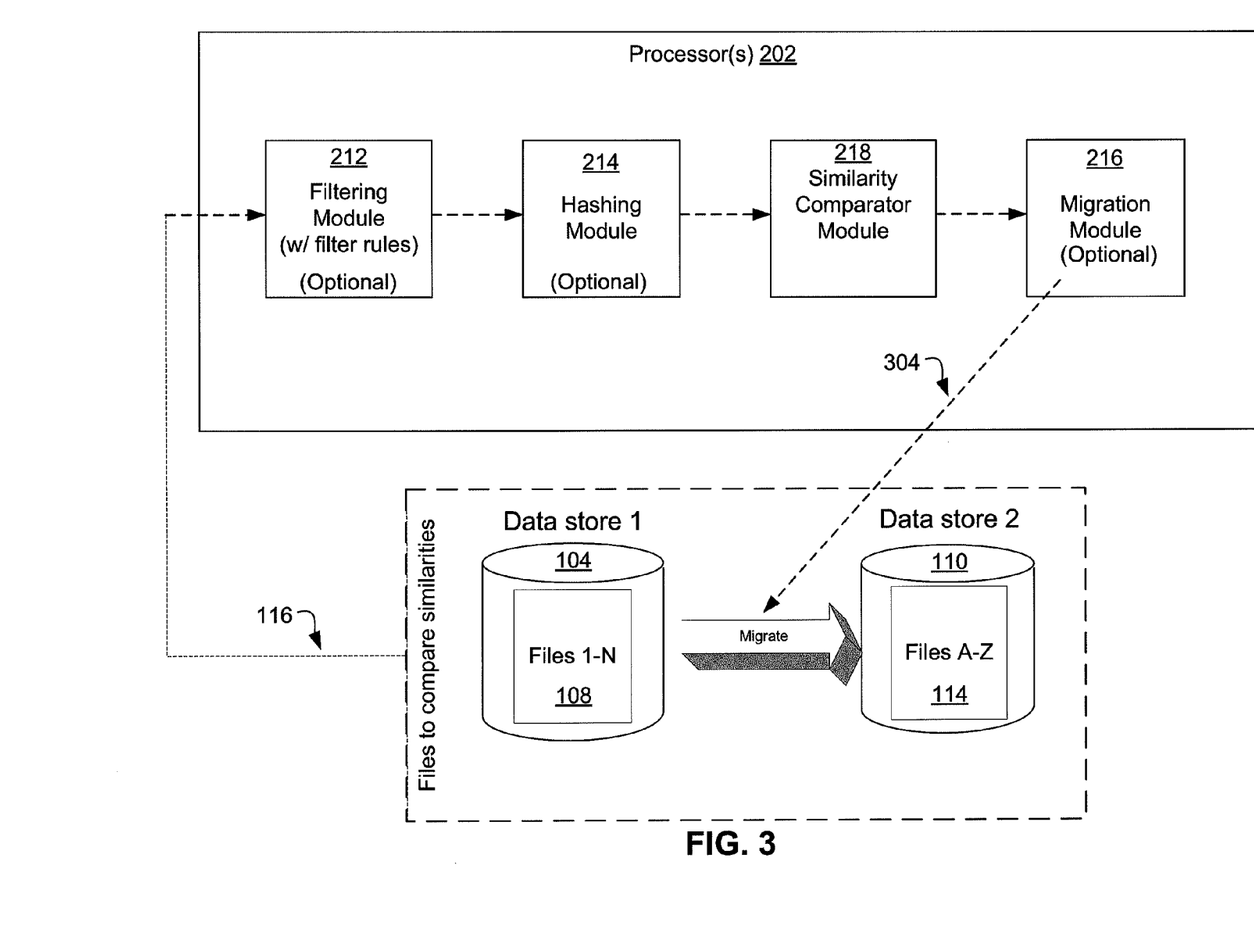
FIG. 3 is a low-level block diagram showing example modules of a processor to implement various functions of the present invention.
Figure 4A:
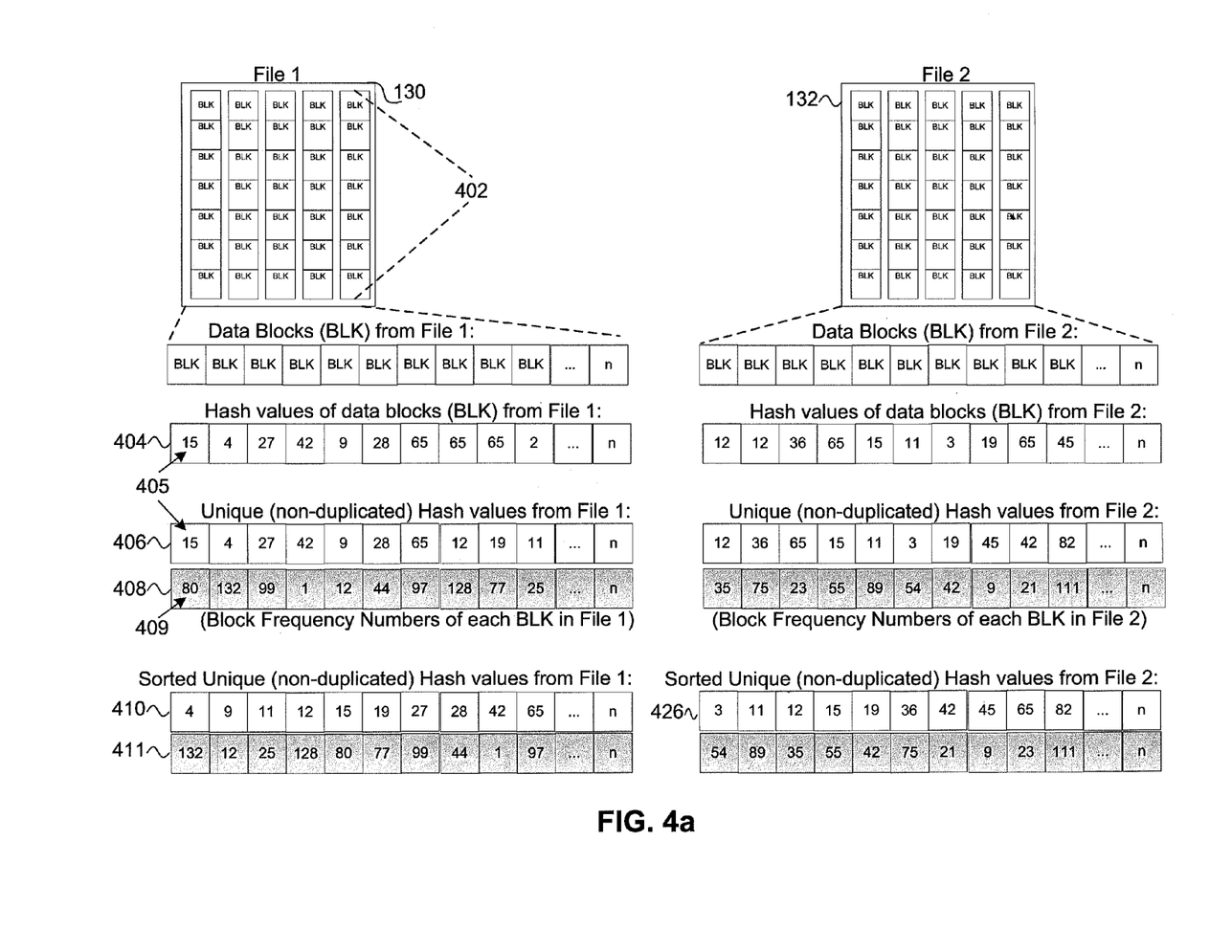
FIG. 4a illustrates an example of a various steps of a similarity comparison of data blocks from two different files.

FIG. 3 illustrates the inter-operation of modules, operating at least in part in the processor(s) 202, to migrate a file based on the files similarity to other files. The similarity comparator module 218 receives files 108 for comparison from, for example, data store 1. Optionally, as described above, files can be filtered based on a block-filtering rule of the filtering module 212 to allow/disallow certain files from comparison. Before receipt by the similarity comparator 218, hash values are generated from the files' data blocks by a hashing algorithm of the hashing module 214. FIG. 4a illustrates a file 130 containing data blocks 402 that are used to generate a series of hash values 404. Each individual hash value of the series of hash values 404 is then passed to the similarity comparator 218 where the hash values are sorted. The similarity comparator 218 utilizes a sorting algorithm to create a list of unique hash values 406 from the hash values 404, and preferably lexicographically sorts each unique hash value, as illustrated at 410. The term "lexicographical sort" refers to the ordering used in creating a dictionary. To lexicographically sort two hash values, the first characters in each hash value are compared. If the characters are identical, then the second characters in each hash value are compared. If the second characters are identical the third, fourth, and remaining characters are compared until two non-identical characters are encountered. When this occurs, the hash value with the character having the smaller value is placed first in the lexicographical ordering. For example, if hash values "B78Q64" and "B78MT3" are compared, the determination of lexicographical order is based on the fourth characters, "Q" and "M". This is because each hash value contains the initial three characters "B78." Since "M" has an ASCII value that is less than "Q", the hash value "B78MT3" would be placed before hash value "B78Q64" in the lexicographical order. The process of creating hash values and sorting the data blocks is referred to in this description as creating a baseline. Creating a baseline is additionally performed, as described above, for file 2. Generating the baseline is costly in terms of time and processing power because, as explained above, every block of each file to compare must be individually hashed and sorted to create the sorted, unique hash values 410.

In one embodiment, to increase the accuracy of the similarity comparison, weights are applied to the data blocks (or hash values of the data blocks). The weight can be a number or sum of numbers associated with one or more of the data blocks (or hash values) to effect a degree of accuracy of the similarity. By non-limiting example, the weight can be an average distribution of a particular block in the data store. In a particular embodiment a series of block-frequency numbers 408 is utilized in the similarity comparison to increase the accuracy of the similarity comparison. The series of block-frequency numbers 408 is generated by the similarity comparator module 218. A block-frequency number 409 represents the number of occurrences of a unique data block (optionally represented as a hash value 405) within the data blocks 402 of a file. For example, data block 15 (405) may be repeated 80 times within the data blocks 402 of file 1 (130). The value 80, therefore, is recorded as a block-frequency number 409 associated with data block 15 (405). This step can be repeated for all of the unique data blocks 406 to create the series of block-frequency numbers 408.

Figure 4B:
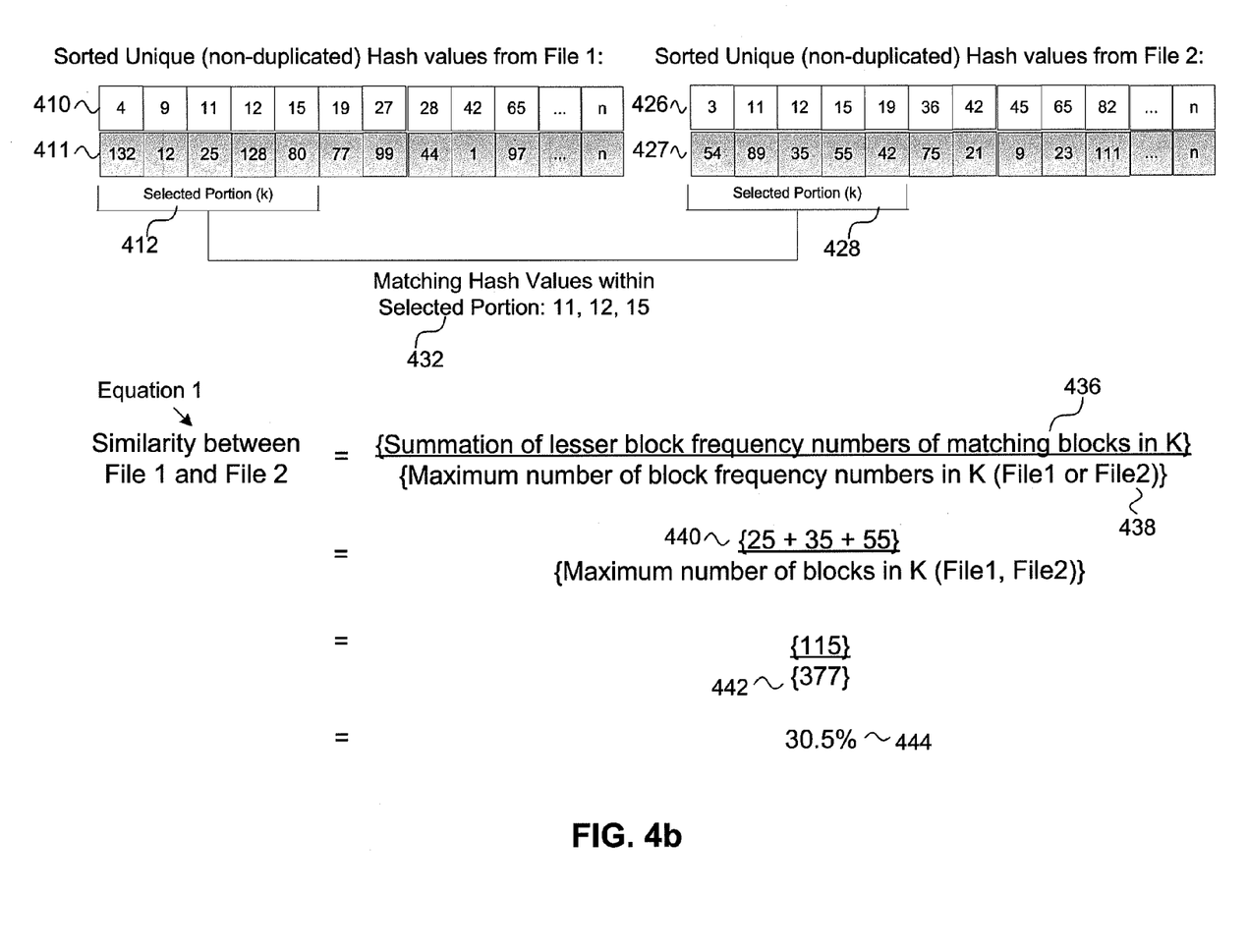
FIG. 4b illustrates an example similarity determination based on frequency-weighted data blocks from two different files.

As illustrated in FIG. 4b, once the baseline steps are performed for file 1 and file 2, for example, the similarity comparator module 218 selects a first portion 412 and 428 of the sorted, unique hash values 410 and 426, respectively. The first portion 412 and 428 are a predetermined number (k) of data blocks of each file for use in the similarity comparison. The number (k) is selectable based on a desired accuracy of the similarity comparison. As can be seen from Equation 1, selecting a high value for k yields higher accuracy in the similarity comparison and selecting a lower value for k yields lower accuracy in the similarity comparison. It should be noted that as greater values are chosen for k, the greater is the time-commitment and performance cost on the processor 202 performing the similarity comparison. Therefore, there is a cost associated with choosing high k values to increase accuracy of the similarity comparison.

The similarity comparator 218 determines the degree of similarity of the files, represented as a percentage 444 and based on Equation 1, by matching identical hash values 432 from the selected portion of file 1 (412) and from the selected portion of file 2 (428). For example, FIG. 4b illustrates that the hash values 11, 12, and 15 (432) are common to each selected portion of file 1 (412) and file 2 (428), where the value of 'k' is five. For each of these hash values, a summation 436 of the hash-values' corresponding block-frequency values is determined, based on the hash value having a lesser block frequency number of the matching pair. For example, matching hash values 11, 12, and 15 have lesser block frequency numbers 25, 35, and 55, respectively. The numerator 436 is divided by a denominator 438, as shown in Equation 1. The denominator 438 is preferably a summation of the number of data blocks (optionally represented as hash values) within the selected portions 412 and 428, whichever is greater. For example, FIG. 4b illustrates a denominator of 377 (442) which is the summation of the five selected block-frequency numbers 412 of file 1, which is larger than the summation of the five selected block-frequency numbers 428 of file 2. A person having ordinary skill in the art will understand that other values for the numerator 436 and/or the denominator 438 can be selected based on the desired accuracy of the similarity comparison.

After the similarity comparator module 218 performs the similarity comparison, other similarity comparisons can be performed on files 108 and files 114 to determine the most suitable data store, such as a logical storage device, to which to migrate file 1. Based on the operations of data de-duplication, available space on a data store is optimized by storing together files having the most similarity; therefore, it may be advantages to identify a least similar file (or dataset) of a data store 104 by performing similarity comparisons on all or a portion of files (or datasets) located at a data store 104. The file (or dataset) having the lowest similarity value of all or a portion of the files (or datasets) at a data store 104 is identified as the least similar file (or dataset). Migration module 216 can migrate 304 files (or datasets) having the lowest similarity value to a separate data store 110 having files 114 (or datasets) more similar to the least similar files. This optimizes each data store by maximizing the available space at the data store after de-duplication.

Figure 4C:
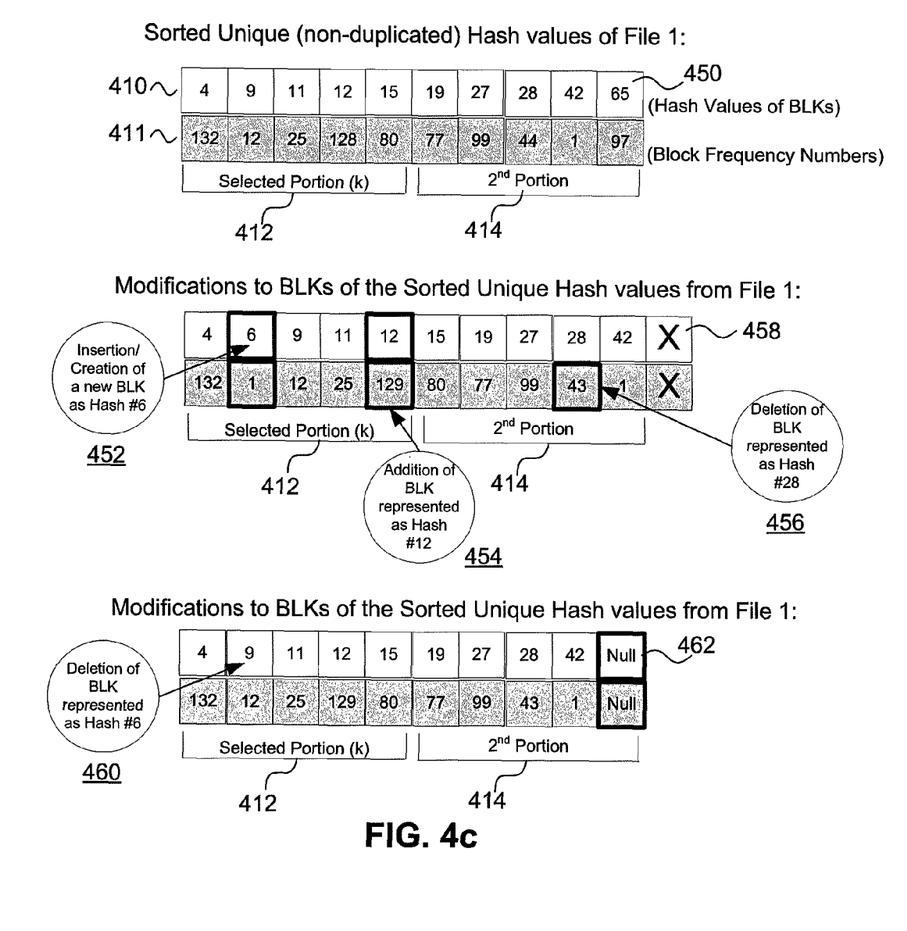
FIG. 4c illustrates an example of re-determining the similarity value based on creating a new data block, updating of an existing block, or removing a data block within a subset of sorted frequency-weighted data blocks of a file.

Once the degree of similarity between files has been determined, one of more of the files may change based on, for example, data being added to and/or removed from one of the files. This alteration of a file changes its existing data block structure and thus its similarity to other files. FIG. 4c illustrates a process of updating the similarity of a file by updating the sorted, unique hash values 410 and block frequency numbers 411 without having to re-determine the entire baseline determination previously described. An alteration to a file affects the sorted, unique hash values 410 only if a data block within the selected portion 412 is affected. If the alteration does not affect the selected portion 412, the values used for the similarity comparison remain unchanged from the previously computed similarity comparison. For example, if a new block added to file 1 has a hash value less than the lowest hash value of the selected portion 412, the addition of that block does not affect the numerator 436 of Equation 1. This avoids the need to re-determine the similarity value.

Alternatively, when a modification to a file's data blocks affects a data block within the selected portion 412, a second portion 414 of the sorted, unique hash values and block frequency numbers is selected to increase the accuracy of the similarity comparison after the file is modified. Similar to the first selected portion 412, the number of data blocks (or hash values) chosen for the second portion 414 is based on the desired accuracy of the similarity comparison. The higher the number chosen, the greater is the accuracy but the greater is the performance cost in generating the comparison. Preferably, the size of the second portion 414 will be a single multiple of the k-value selected in the first selected portion 412.

When a new block 452 is created that has a hash value which, when sorted, is within the selected portion 412, data blocks having smaller hash values are each decremented in placement relative to the new block 452, such that a data block is pushed from the first selected portion 412 into the highest lexicographically sorted position of the second selected portion 414. Decrementing lesser hash values may have the affect of removing the lowest hash value 450 from the sorted, unique hash values 410, as shown by the element 458. Similarly, if a data block 460 within the selected portion 412 is deleted from a file and the data block had a block frequency number of one, all hash values sorted lower than the deleted data block are incremented in placement to take the space of the deleted block. This may have the affect of creating a null value entry 462 for an unused data block in the second portion 414.

If the modification to the file adds a data block 454 already represented in the selected portion 412, the block frequency number associated with that data block is increased. Similarly, if the modification removes a data block 456 already represented by multiple occurrences within the selected portion 412, the block frequency number associated with that data block is decremented.

After all modifications to the file have been made, the similarity comparison between the modified file and another file is determined based on the updated sorted, unique hash values and Equation 1, without resorting or rehashing the entire list of weighted hash values 410, which reduces the time and processing required to perform and incrementally update the similarity comparison.

Figure 5:
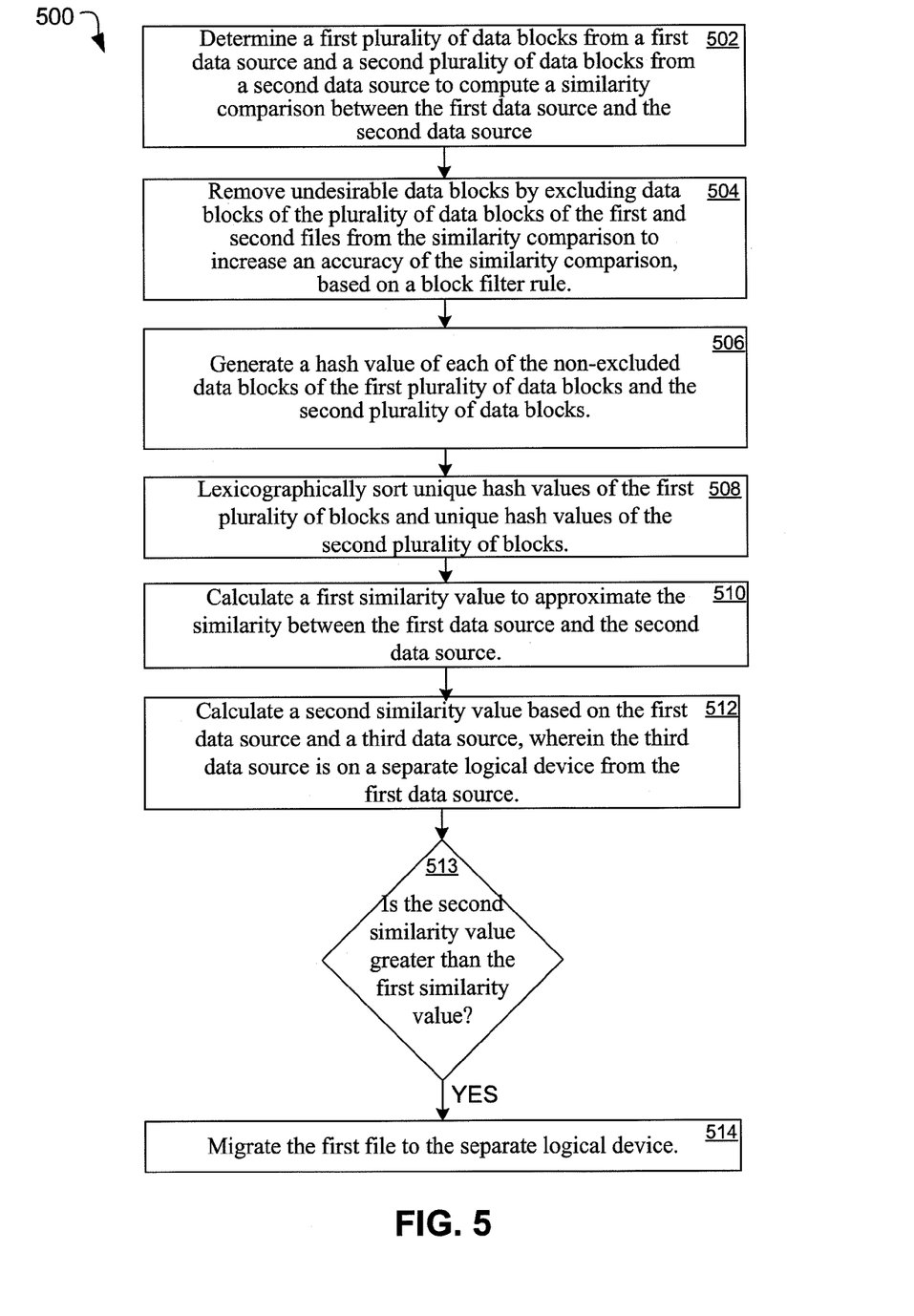
FIG. 5 is a flow diagram illustrating a process for identifying a least similar virtual machine based on sorted frequency-weighted data blocks of multiple virtual machines and migrating the virtual machine to a server.

FIG. 5 is a flow chart illustrating an example of the process of selecting a file to migrate from a first logical storage device to second logical storage device. For the purpose of illustration, the steps of FIG. 5 discuss migrating the data representing a virtual machine from one storage device to another; however, any data source can be utilized. In step 502, the data blocks of each of two virtual machines are identified for use in computing a first degree of similarity between the two virtual machines. Step 504 removes any undesirable blocks from the data blocks of the virtual machines to increase the accuracy of the similarity by use of a block filter rule. In one embodiment, a block filter rule is a predefined (but alterable) set of one or more criteria to exclude (or include) a data block from the similarity comparison, based on one or more characteristics of the data block. One block filter rule, for example, can exclude comparing free space on the virtual machines. Another block filter rule, for example, can exclude a page-file of the virtual machine. In another embodiment, the block filter rule is user-defined such that a user of the system can identify a type of data block to exclude (or include) in the comparison analysis. In step 506, the non-excluded data blocks are used to generate hash values that are lexicographically sorted in step 508. Step 510 includes determining a first similarity value of a first virtual machine to another virtual machine. The first similarity value associated with the first virtual machine is then compared, in step 512, to a second similarity value between the first virtual machine and a virtual machine on a separate, second storage device. If it is determined in step 513 that the second similarity value is greater than the first similarity value (or exceeds a predetermined threshold value), the first virtual machine is migrated to the second storage device in step 514, so that a greater amount of space can be retrieved from the first storage device. In this regard, the least similar virtual machine is identified on the first storage device, because removing that least similar virtual machine will provide the most free-space on the first storage device due to data de-duplication or other storage techniques. In order to further save additional storage space on other storage devices, the least similar virtual machine is migrated to a storage sever having virtual machines most similar to the least similar virtual machine.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    accessing a plurality of datasets, each dataset including a plurality of blocks; and
    determining a degree of similarity between two or more of the plurality of datasets by comparing a subset of sorted weighted blocks from one dataset to a subset of sorted weighed blocks from another dataset.

2. The method of claim 1, wherein the sorted weighted blocks of the subsets are sorted frequency-weighted blocks, and a frequency-weighted value of a frequency-weighted block of the subset corresponds to a number of repeat occurrences of a particular data block occurring within the data blocks of an individual dataset of the plurality of datasets.

3. The method of claim 2, wherein the frequency-weighted values are frequency-weighted hash values, wherein the frequency-weighted values affect the accuracy of the similarity, and wherein the sorted frequency-weighted blocks are sorted lexicographically.

4. The method of claim 1, further including identifying a least similar dataset of the plurality of datasets to migrate to a logical storage device, based on the degree of similarity, wherein the logical storage device has a dataset determined to be similar to the least similar dataset.

5. The method of claim 4, wherein the two or more plurality of datasets are virtual machine data image files, and the logical storage device is part of a storage server.

6. The method of claim 1, further including updating the degree of similarity after a block within the subset of weighted blocks has changed, and wherein the change is a block creation, update, or deletion.

7. The method of claim 1, further comprising excluding a data block from the sorted weighted blocks to increase an accuracy of the degree of similarity, wherein excluding a data block is based on a block filter rule.

8. A method comprising:
    determining a similarity value to determine how similar a first dataset is to a second dataset,
    wherein the first dataset and the second dataset each have data blocks, and
    wherein the similarity value is based on:
        sorting the data blocks of the first and second datasets,
        determining a subset of the sorted data blocks of the first and second datasets, and
        matching data blocks from the subset of the first dataset with identical data blocks from the subset of the second dataset; and
    in response to a modification to a data block of the data blocks of either the first dataset or the second dataset, re-determining the similarity value without sorting all of the data blocks of the first or second datasets, based on whether the modification affects a data block within the subset of the sorted data blocks of the first dataset.

9. The method of claim 8, wherein an accuracy of the similarity value is increased based on:
    utilizing a ratio of a first sum of block frequency numbers to a second sum of block frequency numbers to compute the similarity value,
    wherein a block frequency number of the block frequency numbers corresponds to a number of repeat occurrences of a particular data block of the subset occurring within the data blocks of the first or second datasets,
    wherein the first sum of block frequency numbers corresponds to the matching data blocks, and
    wherein the first sum is less than the second sum.

10. The method of claim 9, wherein the first sum of block frequency numbers is determined by adding together each of a lowest block frequency number representing each of the matching data blocks, and wherein the second sum of block frequency numbers is determined by utilizing a higher value of either a total number of blocks forming the subset of the first dataset or a total number of blocks forming the subset of the second dataset.

11. The method of claim 8, wherein the re-determination of the similarity value is further based on a second subset of the sorted data blocks of the first and second datasets,
    wherein each of the sorted data blocks of the first and second datasets are hash values of the data of the respective data blocks,
    wherein data blocks of the second subset are adjacent to the data blocks of the first subset,
    wherein the sorting is performed lexicographically, and
    wherein the number of the data blocks in the second subset is based on a desired accuracy of the first similarity value.

12. The method of claim 11, wherein, when the modification is an insertion of a new data block having a hash value lexicographically between the hash values of the sorted data blocks of the subset of the first dataset, a data block having a lowest hash value of the sorted data blocks of the subset is removed from the subset and added to the second subset, wherein the data block having the lowest hash value is sorted such that the data block is a data block having a highest hash value of the second subset.

13. The method of claim 12, wherein, in response to the addition of the data block into the second subset, a lowest valued data block of the second subset is removed from the second subset.

14. The method of claim 11, wherein, when the modification is a deletion of a data block of the subset of the first dataset and the data block to delete has a hash value lexicographically between the hash values of the sorted data blocks of the subset of the first dataset, the block frequency of the data block to delete is decremented, and wherein each data block of the subset having a hash value less than the deleted data block increases in position to replace the data block removed from the subset.

15. The method of claim 14, wherein, when the block frequency number reaches zero, the data block to delete is removed from the subset, and a data block having a highest hash value of the second subset becomes a data block having a lowest hash value of the first subset.

16. The method of claim 8, further comprising excluding a data block from the similarity comparison to increase an accuracy of the similarity value, wherein the excluded data block is based on a block filter rule.

17. The method of claim 8, wherein each sorted one or more data blocks of the first and second datasets are hash values of the data of the respective one or more data blocks, and wherein the sorting is performed lexicographically, and wherein the hash values are unique, non-duplicated hash values.

18. The method of claim 8, further comprising in response to determining a second similarity value of the first dataset to a third file, migrating the first dataset from a first device to a second device, wherein the third file is hosted on the second device.

19. The method of claim 18, wherein the migration of the first dataset from the first device to the second device occurs after the second similarity value exceeds a desired threshold value.

20. A method, comprising:
determining a first plurality of data blocks from a first data source and a second plurality of data blocks from a second data source to compute a similarity comparison between the first data source and the second data source;
generating a hash value of each of the data blocks of the first plurality of data blocks and the second plurality of data blocks;
creating a first list of unique hash values based or the generated hash values of the data blocks of the first plurality of data blocks,
wherein each unique hash value of the first list has a block frequency number corresponding to the number of repeat occurrences of an individual data block within the plurality of blocks of the first data source;
creating a second list of unique hash values based on the generated hash values of the data blocks of the first plurality of data blocks,
wherein each unique hash value of the second list has a block frequency number corresponding to the number of repeat occurrences of an individual data block within the plurality of blocks of the second data source;
sorting the first and second lists of unique hash values;
in response to selecting an initial portion of the sorted first and second lists, determining a similarity value of the first data source with respect to the second data source based on:
determining one or more identical hash value pairs, wherein one hash value of the pair is from the initial portion of the sorted first list and the other hash value of the pair is from the initial portion of the sorted second list, and
computing the similarity value based on a ratio of a first sum of block frequency numbers to a second sum of block frequency numbers, wherein the first sum of block frequency numbers includes a block frequency number corresponding to one of the hash values of each of the one or more identical hash value pairs.

21. The method of claim 20, wherein the first sum of block frequency numbers is determined by adding together each of a lowest block frequency number representing each of the matching one or more data blocks, and wherein the second sum of block frequency numbers is determined by utilizing a higher value of either a total number of blocks forming the subset of the first data source or a total number of blocks forming the subset of the second data source.

22. The method of claim 20, wherein the determination of the similarity value is further based on a second portion of the sorted first and second lists,
wherein data blocks of the second portion are each associated with a corresponding block frequency number, and
wherein data blocks of the second portion are sorted adjacent to the one or more data blocks of the initial portion.

23. The method of claim 22, wherein, in response to a modification to a data block of the one or more data blocks of either the first data source or the second data source, the similarity value is re-determined without sorting all of the one or more data blocks of the first or second lists and wherein only data blocks within the initial portion and the second portion are sorted.

24. The method of claim 23, wherein, when the modification is an insertion of a new data block having a hash value, which when sorted is lexicographically greater than the lowest hash value of the initial portion of the first list, a data block having the lowest hash value is removed from the initial portion and added to the second portion,
wherein the second portion is sorted lexicographically such that a data block having the lowest hash value of the initial portion is positioned lexicographically before a data block having a highest valued data block of the second portion,
wherein, the block frequency number of the inserted data block is incremented, and
wherein, the number of the data blocks within the second portion is determined based on a desired accuracy of the similarity value, and
wherein, in response to adding the data block into the second portion, a lowest valued data block of the second portion is removed from the second portion.

25. The method of claim 23, wherein, when the modification is an update of a data block of the initial portion of the first list, the block frequency number of the updated data block is modified.

26. The method of claim 25, wherein, when the update deletes a data block of the initial portion, the block frequency number is deprecated, and
wherein, when the block frequency number of the data block to be deleted is zero, the data block is removed from the initial portion.

27. The method of claim 26, wherein each of the data blocks of the initial portion having a hash value less than the hash value of the deleted data block are sorted such that the data blocks increase in position to replace the data block removed from the initial portion, and
wherein a data block having a highest hash value of the second portion is sorted such that the data block is a lowest hash value of the initial portion.

28. The method of claim 25, wherein, when the update adds a data block having the same hash value as a data block of the initial portion, the block frequency number of the data block is increased.

29. The method of claim 20, wherein the first and second plurality of data blocks are a respective first and second virtual machine data image file, and
 wherein the first and second data sources are a respective first and second storage server.

30. A processing system comprising:
 a first logical storage device, the first logical storage device including a first dataset having a plurality of data blocks; and
 a processor, the processor for computing a similarity comparison between the first dataset and a second dataset having a plurality of data blocks, which, in operation, causes the system to:
 exclude a data block of the plurality of data blocks of the first dataset from the similarity comparison to increase an accuracy of the similarity comparison, wherein the exclusion of a block is based on a block filter rule;
 determine a first similarity value to approximate a degree of similarity between the first dataset and the second dataset,
  wherein the first similarity value is based on a number of occurrences of a particular block in each of the first and second datasets, and
  wherein the particular block occurs within a sorted subset of the plurality of data blocks of the first and second datasets;
 determine a second similarity value based on the first dataset and a third dataset, wherein the third dataset is stored at a second logical storage device that is not the first logical storage device, and
 in response to the second similarity value being less than the first similarity value, a means to migrate the first dataset to the second logical storage device.

31. The method of claim 30, wherein the block filter rule excludes comparing free space or excludes comparing a pagefile.

32. The method of claim 30, wherein the block filter rule is configurable by a user.

33. A processing system comprising:
 a hashing module to generate a hash value for sets of data blocks, each of the sets of data blocks corresponding to a different one of a plurality of virtual machine data image files; and
 a similarity comparator module to compute a degree of similarity between two or more of the sets of data blocks, based on:
 determining one or more identical hash value pairs, wherein one hash value of a pair is from an initial portion of a sorted first list and the other hash value of the pair is from an initial portion of a sorted second list, and
 computing a similarity value based on a ratio of a first sum of block frequency numbers to a second sum of block frequency numbers, wherein the first sum of block frequency numbers includes a block frequency number corresponding to one of the hash values of each of the one or more identical hash value pairs.

34. The system of claim 33, further comprising a filtering module to exclude a data block of the sets of data blocks from a computation of the similarity comparator module, wherein the exclusion of a block is based on a block filter rule.

35. The system of claim 33, further comprising a migration module to migrate one set of the sets of data blocks from a first storage server to a second storage server, based on a degree of similarity between said one set of data blocks and a set of data blocks at the second storage server.

* * * * *